United States Patent Office 3,057,105
Patented Oct. 9, 1962

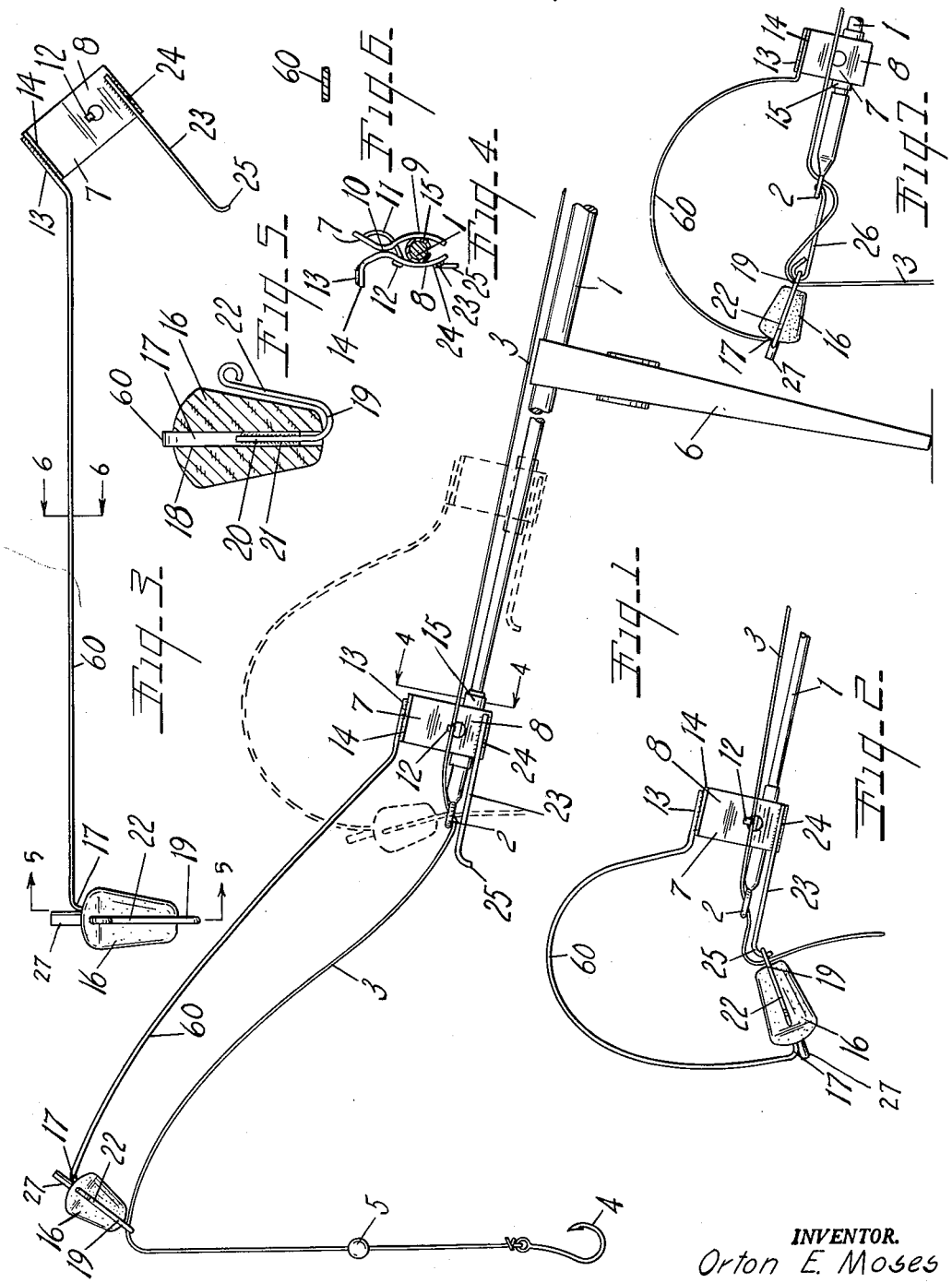

3,057,105
FISHING ROD SIGNAL DEVICE
Orton E. Moses, 4107 W. Main St., Kalamazoo, Mich.
Filed Mar. 2, 1961, Ser. No. 92,817
6 Claims. (Cl. 43—16)

This invention relates to a strike signal device for a fishing rod. The main objects of this invention are, First, to provide a fishing rod signal device which is adapted to be attached to widely varying types of fishing rods, particularly of the so-called casting type to adapt the same for use in so-called still fishing.

Second, to provide a fishing rod which includes means for visually indicating a bite of a fish.

Third, to provide a device of the above stated character which acts to engage the hook.

Fourth, to provide a signal device which may be used on rods substantially varying in structure and diameter and may be supportedly adjusted longitudinally of the rod for particular desired adaptations.

Fifth, to provide a device having these advantages which adds little weight to the rod to which it is attached and does not unbalance the rod.

Objects relating to details and economies of the invention will appear from the description to follow. The invention is defined and pointed out in the claims. A preferred embodiment of the invention is illustrated in the accompanying drawing, in which:

FIG. 1 is a fragmentary side elevational view of one embodiment of my invention, the signal device being shown in one position by full lines and in another position by dotted lines.

FIG. 2 is a fragmentary side elevational view with the signal member in its hooked-down position.

FIG. 3 is a side elevational view of the signal means detached from the rod.

FIG. 4 is a cross sectional view on a line 4—4 of FIG. 1.

FIG. 5 is an enlarged fragmentary view on a line 5—5 of FIG. 3.

FIG. 6 is a cross sectional view on a line corresponding to line 6—6 of FIG. 3.

FIG. 7 is a fragmentary view of a modified form or embodiment of my invention.

In the accompanying drawing only the outer end portion of the rod 1 is illustrated, as fishing rods vary greatly in length and structural details and embodiments of applicant's invention may be used in fishing rods having varying structural features. The rod 1 is provided with a line guide eye 2 at its outer end through which the line 3 is passed. A hook 4 is attached to the outer end of the line and 5 indicates a sinker. The strut or rod support 6 illustrated in FIG. 1 forms no part of the present invention and therefore the details are not illustrated and it has no coacting relation with the parts of applicant's invention.

Applicant's invention is highly desirable for use in so-called ice fishing where it is quite common practice to provide supports for the rod. The springably resilient arm 60 is desirably formed of steel and is mounted at its inner end on the rod engaging clip designated generally by the numeral 7, and comprising the rod engaging jaw members 8 and 9 which are hingedly connected at 10, the jaw member 9 having a portion 11 thereof struck out to provide a spring which is engaged at 12 with the jaw member 8.

The arm 60 has an angularly disposed inner end portion 13 which is secured to the laterally projecting upper end portion 14 of the clip member 7. With the arm thus connected it is disposed at or projects at an angle from the rod, as is illustrated in FIG. 1. The clip may be adjustably engaged longitudinally of the rod and is desirably provided with a clutch sleeve 15 which is a section of rubber tubing split so that it may be slipped on the rod. The function of the sleeve is to provide a more effective gripping engagement of the clip with the rod and with rods of substantially varying diameter.

The signal member 16 is mounted on the outer end of the arm 60 which has a downturned portion 17 disposed in and secured within the bore 18 of the signal 16. The signal 16 is desirably colored to add to its visibility. In the embodiment illustrated, the line guide eye member 19 is formed of a U-shaped piece of wire, its inner arm 20 being arranged within the bore 18 and fixedly secured at 21 as is indicated by welding. The outer arm 22 of this eye projects upwardly at the side of the signal member so that the line 3 may be releasably engaged with the eye, see FIG. 5. After the parts are assembled as illustrated in FIG. 5, a pin or plug 27 is inserted in the bore 18 in clamping engagement with the portion 17 of the member 60 inserted in the bore.

In the preferred embodiment of my invention the clip is provided with a forwardly projecting detent 23 which is fixedly welded thereto at 24 and provided with a downturned tip 25 with which the eye member 19 may be engaged when the clip is positioned at the end of the rod, as is indicated by full lines in FIGS. 1 and 2, the clip being shown in its retracted position by dotted lines in FIG. 1. With the parts arranged as shown in full lines in FIGS. 1 and 2, the eye 19 at the lower end of the signal is engaged with the hook 25, see FIG. 2. With the parts thus arranged a pull, even slight, on the depending end of the line disengages the eye 19 from the hook 25 and the signal is given by the upward swing of the signal member.

The arm 60 is at stated springably resilient and may be bent or flexed into bowed form as is illustrated in FIG. 2 so that the eye member 19 may be engaged with the downturned end 25 of the detent 23, the arm 60 being in all positions of adjustment disposed to project forwardly of the outer end of the rod.

In the embodiment illustrated in FIG. 7 the signal member is provided with a hook 26 which is engageable with the eye 2 on the end of the rod. In all embodiments and adaptations a pull on the line such as results from a "bite" or "strike'" of a fish disengages the hook so that the signal is released and swings upwardly.

Both of the embodiments of my invention illustrated are highly practical. I have not illustrated other embodiments or adaptations of my invention as it is believed that this disclosure will enable those skilled in the art to embody or adapt my invention as may be desired.

Having thus described the invention, what is claimed as new and desired to secure by Letters Patent is:

1. A signal means adapted to be attached to a fishing rod and comprising an elongated springably resilient arm, a rod engaging clip to which the inner end of said arm is secured with the arm disposed at an angle to the rod with which the clip is engaged, a signal member mounted on the outer end of said arm and having a bore therethrough, said arm having a downturned outer end portion retainingly secured in said bore, a line guide eye member of generally upwardly facing U-shape one arm of which is disposed in said bore in said signal member and secured therein with the other arm thereof projecting upwardly at the side of the signal member and with which a line is threadedly engaged, a downwardly facing detent mounted on said rod engaging clip to project forwardly therefrom, said clip being supportedly positionable on said rod and so that said detent projects from the outer end thereof, said line guide eye member on said signal member being releasable engageable with said detent with the signal member under spring tension whereby a pull on the portion of the line extending from said eye member acts to disengage the arm from said detent.

2. In combination, a fishing rod provided with a line guide eye member, a line threaded through said eye member, a springably resilient arm mounted on said rod to project laterally and forwardly therefrom, a signal member mounted on the outer end of said arm, a line guide eye member mounted on said signal member and provided with an upwardly projecting arm disposed at the side of the signal member and with which said line is threadingly engaged, and a link-like coupling member swingably engaged with said line guide eye member mounted on said signal member and having an outer end portion engageable with said eye member on said rod with said arm under spring tension whereby a pull on the portion of the line extending from said eye member on said arm acts to disengage said coupling member from said eye member on said rod.

3. A signal means adapted to be attached to a fishing rod and comprising an elongated springably resilient arm provided with a line guide eye member at its outer end, a rod engaging clip to which the inner end of said arm is secured with the arm disposed at an angle to the rod when the clip is engaged with the rod, a signal member mounted on the outer end of said arm, and a downwardly facing detent mounted on said rod engaging clip to project forwardly therefrom, said clip being positionable on the rod with said detent projecting from the outer end thereof, a portion of said line guide eye member being releasably engageable with said detent with the arm under spring tension disposed so that a pull on the portion of a line extending from said eye member on said arm acts to release the arm from said detent.

4. In combination, a fishing rod provided with a line guide eye member at its outer end, a line threaded through said eye member, an elongated springably resilient arm, a rod engaging clip to which the inner end of said arm is secured with the arm disposed at an angle when the clip is engaged with the rod, a longitudinally split tubular element adapted to be sleeved upon said rod and with which said clip is to be clampingly engaged, said sleeve being slidably adjustable longitudinally of said rod, said arm being provided with a line receiving eye member at its outer end through which said line is threaded, and releasable connectable means on said clip and arm acting to hold said arm under spring tension, a pull on the portion of a line extending from the end of said arm acting to disengage said releasable connection means for disengagement of said outer end of said arm from said clip.

5. In combination, a fishing rod provided with a line guide eye member at its outer end, a line threaded through said eye member, an elongated springably resilient arm, a rod engaging clip to which the inner end of said arm is secured with the arm disposed at an angle to and projecting forwardly from the rod, said arm being provided with a line receiving eye member at its outer end through which said line is threaded, and coacting releasable engageable connecting means on said clip and arm acting when engaged to hold said arm under spring tension, a pull on the portion of the line extending from the end of said arm acting to disengage said releasable connection means for disengagement of said outer end of said arm from said clip.

6. The combination with a fishing rod provided with a line guide eye member at its outer end and a line reciprocatingly threaded through said eye member, of a signal means comprising an elongated springably resilient arm having outer and inner ends, a line guide member on the outer end of said arm, a rod engaging clip adjustably and supportedly engaged with the rod and to which the inner end of said arm is fixedly secured so that it projects laterally from and at angle to the rod, said clip having a downwardly facing detent projecting forwardly therefrom, said clip being positionable on said rod so that said detent projects forwardly therefrom, said line guide eye member on said arm being engageable with said detent with said arm springably bowed and being disengaged from said detent by a pull on the portion of a line extending from said eye member on said arm.

References Cited in the file of this patent

UNITED STATES PATENTS

| 1,317,843 | Wehner et al. | Oct. 7, 1919 |
| 2,549,295 | Derby | Apr. 17, 1951 |
| 2,658,299 | Maxfield | Nov. 10, 1953 |
| 2,931,122 | Thordson et al. | Apr. 5, 1960 |

FOREIGN PATENTS

| 984,278 | France | Feb. 21, 1951 |